United States Patent [19]

Shirai et al.

[11] Patent Number: 5,718,858

[45] Date of Patent: Feb. 17, 1998

[54] APPARATUS, METHOD, AND COATING DIE FOR PRODUCING LONG FIBER-REINFORCED THERMOPLASTIC RESIN COMPOSITION

[75] Inventors: Yoshimitsu Shirai, Shizuoka; Motohito Hiragohri, Fuji; Takeshi Amaike, Fuji; Haruji Murakami, Fuji, all of Japan

[73] Assignee: Polyplastics Co., Inc., Osaka, Japan

[21] Appl. No.: 596,347

[22] PCT Filed: Aug. 17, 1994

[86] PCT No.: PCT/JP94/01363

§ 371 Date: Feb. 16, 1996

§ 102(e) Date: Feb. 16, 1996

[87] PCT Pub. No.: WO95/05279

PCT Pub. Date: Feb. 23, 1995

[30] Foreign Application Priority Data

Aug. 17, 1993 [JP] Japan .................. 5-222754

[51] Int. Cl.[6] .................................................. B29C 47/02
[52] U.S. Cl. ........................ 264/136; 118/419; 264/143; 264/171.13; 264/171.23; 425/188; 425/382.4; 425/461; 425/466
[58] Field of Search ............... 264/171.13, 171.23, 264/141–143, 136–137; 425/461, 466, 467, 224, 188, 145, 382.4; 118/419

[56] References Cited

U.S. PATENT DOCUMENTS

| | | | |
|---|---|---|---|
| 3,823,053 | 7/1974 | Straub et al. | 425/466 |
| 3,956,056 | 5/1976 | Boguslawsji et al. | |
| 4,329,133 | 5/1982 | Gallizia | 425/382.4 |
| 4,411,614 | 10/1983 | Feathers | 425/382.4 |
| 4,588,538 | 5/1986 | Chung et al. | 264/171.13 |
| 4,937,028 | 6/1990 | Glemet et al. | 264/171.13 |
| 4,957,422 | 9/1990 | Glemet et al. | 425/382.4 |
| 4,984,533 | 1/1991 | Takahashi et al. | 425/466 |
| 5,516,273 | 5/1996 | Delmore et al. | 425/382.4 |
| 5,520,867 | 5/1996 | Shirai et al. | 264/171.13 |
| 5,522,931 | 6/1996 | Iwashita et al. | 425/461 |
| 5,573,813 | 11/1996 | Custer et al. | 264/257 |

FOREIGN PATENT DOCUMENTS

| | | | |
|---|---|---|---|
| 61-270114 | 11/1986 | Japan | 425/382.4 |
| 63-264326 | 11/1988 | Japan . | |
| 1-105722 | 4/1989 | Japan | 425/461 |
| 3-272830 | 12/1991 | Japan . | |

OTHER PUBLICATIONS

International Search Report PCT/JP 94/01363.

*Primary Examiner*—Jeffery R. Thurlow
*Attorney, Agent, or Firm*—Nixon & Vanderhye P.C.

[57] ABSTRACT

Apparatus and methods are provided for producing a long fiber-reinforced thermoplastic resin compositions by initially loosening a continuous fiber bundle by a fiber loosening device so as to form a moving web-like continuous fiber bundle. At least one side of the moving web-like continuous fiber bundle which passes through the die is coated with a thermoplastic resin melt extruded through a slit disposed in the die by an extruder. The slit has substantially the same width as that of the web-like continuous fiber bundle to provide an even supply of the resin melt in the width direction of the web-like continuous fiber bundle. However, the slit has a spacing which changes at a point in the widthwise direction of the web-like continuous fiber bundle so as to be increased as the point is more remote from a feed port and have a constant spacing in the flowing direction of the thermoplastic resin melt. The web-like continuous fiber bundle is thus impregnated with the resin melt by an impregnating device having a path which has a rough surface. The thus impregnated web-like continuous fiber bundle may then be shaped to form a final product.

8 Claims, 4 Drawing Sheets

*Fig. 1(a)*
*Fig. 1(b)*
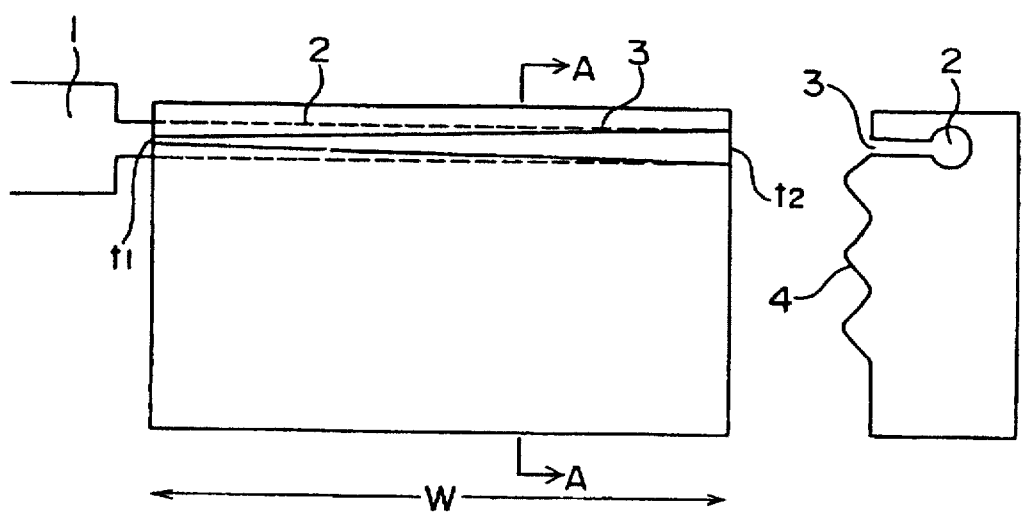
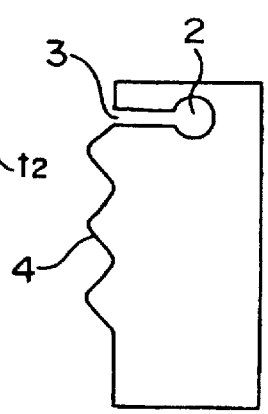
*Fig. 2*
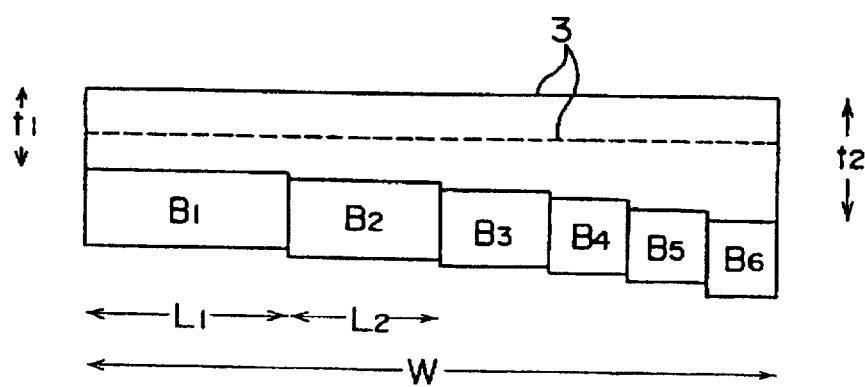

APPARATUS, METHOD, AND COATING DIE FOR PRODUCING LONG FIBER-REINFORCED THERMOPLASTIC RESIN COMPOSITION

TECHNICAL FIELD

The present invention relates to an apparatus and a method for producing a long fiber-reinforced thermoplastic resin composition composed of a thermoplastic resin and fiber bundles. The invention also relates to a die used in the production of composite materials of a thermoplastic resin and fiber bundles, and more particularly, to a coating die used in the production of a long fiber-reinforced thermoplastic resin composition.

BACKGROUND ART

As examples of apparatuses for producing long fiber-reinforced thermoplastic resin compositions, there are coating dies with interior passages. Fiber bundles are passed continuously through the interior passages, while a thermoplastic resin melt is extruded into the passages for coating the fiber bundles. The resin coat is allowed to permeate into the fiber bundles.

Japanese Patent Application Laid-open (kokai) No. 63-264326 discloses a coating die used in the production of thermoplastic resin profiles reinforced with continuous long fibers. Continuous roving fibers are coated with a thermoplastic resin inside the die. FIG. 7 in the present specification is an example of the die used for coating described in that publication. A thermoplastic resin supplied from an extruder to supply tubes 2 and 2' as indicated by arrows $F_1$ and $F_2$ is allowed to pass through slits $S_1$ and $S_2$ which are elongated in the width direction W for permeating into and coating a roving which moves in the direction of H.

The coating die disclosed in Japanese Patent Application Laid-open (kokai) No. 63-264326 has the drawback that supply of a resin melt, coating of fiber bundles, and impregnation of fiber bundles tend to become uneven in the width direction of the roving. Moreover, differences in supply pressure and in amount of supply of the resin which is supplied in the width direction of the roving brings about further problems of clogging of the die and breakage of fibers which occurs due to the uneven shear force against the resin generated inside the subsequent forming die.

The present invention was accomplished after careful studies in view of the above problems. It is therefore an object of the present invention to solve the above problems and to provide an apparatus, a method, and a coating die for producing a long fiber-reinforced thermoplastic resin composition.

DISCLOSURE OF THE INVENTION

Accordingly, a first aspect of the present invention is drawn to an apparatus for producing a long fiber-reinforced thermoplastic resin composition characterized in that at least one side of a moving web-like continuous fiber bundle which has undergone fiber-loosening is coated with a thermoplastic resin melt which is extruded through a slit disposed in the apparatus, the slit having substantially the same width as that of the web and having a spacing which changes in the width direction of the web. A second aspect of the present invention is drawn to a method for producing a long fiber-reinforced thermoplastic resin composition characterized in that at least one side of a moving web-like continuous fiber bundle which has undergone fiber-loosening is coated with a thermoplastic resin melt which is extruded through a slit disposed in the apparatus, the slit having substantially the same width as that of the web and having a spacing which changes in the width direction of the web.

A third aspect of the present invention is drawn to a coating die for producing a long fiber-reinforced thermoplastic resin composition in which at least one of the upper and lower sides of a web-like continuous fiber bundle which has undergone fiber-loosening and which passes through the die is coated with a thermoplastic resin melt which is extruded through a slit disposed in the apparatus and having substantially the same width as that of the web, characterized in that the slit has a spacing which changes in the width direction of the web.

A fourth aspect of the present invention is drawn to a coating die for producing a long fiber-reinforced thermoplastic resin composition as described in the third aspect, wherein the spacing of the slit is tapered. The fourth aspect of the invention also encompasses a coating die for producing a long fiber-reinforced thermoplastic resin composition characterized in that the spacing of the slit described in the third aspect is changed by the use of retractable block pieces.

A fifth aspect of the present invention is drawn to a coating die for producing a long fiber-reinforced thermoplastic resin composition in which at least one of the upper and lower sides of a web-like continuous fiber bundle which has undergone fiber-loosening and which passes through the die is coated with a thermoplastic resin melt which is extruded through a slit disposed in the apparatus and having substantially the same width as that of the web, characterized in that one of slit-forming members which form the slit therebetween is stationary and the other slit-forming member is pivotable about a hinge provided at one end thereof. The fifth aspect of the invention also encompasses a coating die for producing a long fiber-reinforced thermoplastic resin composition characterized in that the spacing of the slit is tapered. The expression "one end of a slit-forming member" is intended to mean an end portion or its vicinity of a slit-forming member.

A sixth aspect of the present invention is drawn to a coating die for producing a long fiber-reinforced thermoplastic resin composition in which at least one of the upper and lower sides of a web-like continuous fiber bundle which has undergone fiber-loosening and which passes through the die is coated with a thermoplastic resin melt which is extruded through a slit disposed in the apparatus and having substantially the same width as that of the web, characterized in that the spacing of a narrow part of the resin supply path leading to the slit in the die is reduced by retractable block pieces so as to vary the amount of supply of the thermoplastic resin melt in the width direction of the web. In the above-described aspects of the present invention, the width of the slit may be slightly different from that of the web so long as the two widths are approximately identical. Hereafter, a description will be given centering on a typical coating die for producing long fiber-reinforced thermoplastic resin compositions of each aspect.

With the coating die for producing long fiber-reinforced thermoplastic resin compositions of the present invention, it is possible to sequentially or arbitrarily change, in the width direction of the web, the amount of a thermoplastic resin extruded. Due to the positional relationship of the slit and the supply path of a thermoplastic resin melt supplied from outside the coating die by an extruder, etc., conventional slits having a constant spacing cannot avoid uneven extrusion of a thermoplastic resin melt in the width direction of a web since the supply pressure of the resin applied to the portion of a slit on the upstream side of the supply path is greater than that applied to other portions of the slit. According to the coating die of the present invention, it is possible to eventually achieve uniform extrusion.

When a slit having a constant spacing in the width direction of the web of a continuous fiber bundle is used, the spacing of a narrow part of the resin path in the die leading to the slit is reduced by the use of retractable block pieces of the present invention so as to change the amount of supply of a resin melt in the width direction of a web. Therefore, in a case where the spacing of the narrow part of the resin path is not reduced and the amount of extrusion from the slit is uneven in the width direction of the web, it is possible to eventually make uniform the amount of the thermoplastic resin extruded.

BRIEF DESCRIPTION OF THE DRAWINGS

FIG. 1(a) is a plan view showing a die according to an embodiment of the present invention. FIG. 1(b) shows the cross-section of (a) cut along the line AA.

FIG. 2 is an illustration directed to a slit according to another embodiment of the present invention.

FIG; 3 is an illustration directed to a slit according to a still further embodiment of the present invention.

Figure 4A:
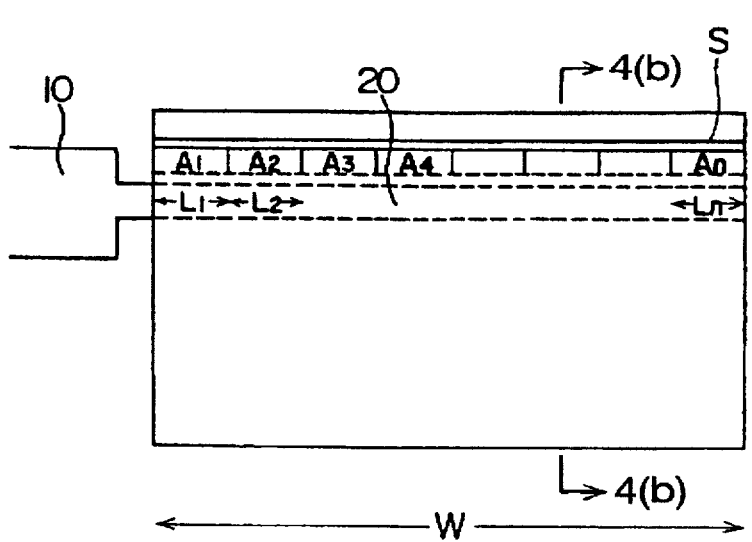
Figure 4B:
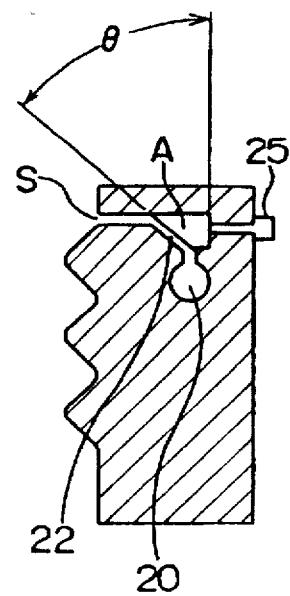

FIG. 4(a) is a plan view of an embodiment in which a narrow part of a path for supplying a thermoplastic resin melt is reduced in the width direction of a web by the use of block pieces. FIG. 4(b) shows the cross-section of (a) cut along the line BB.

Figure 5A:
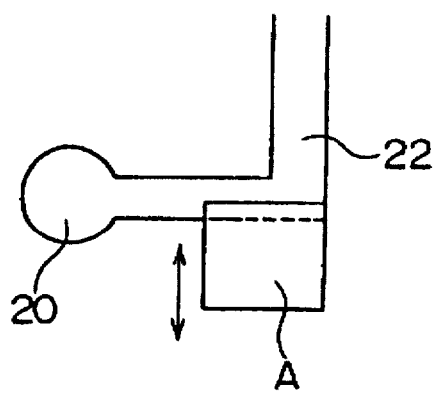
Figure 5B:
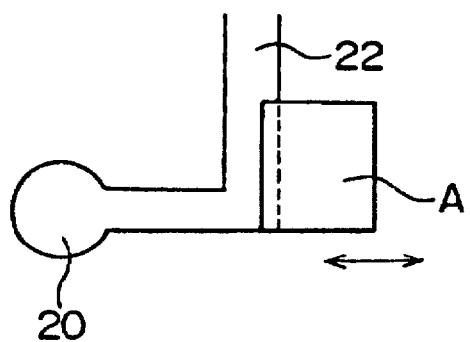

FIG. 5(a) is the cross-section cut along the line BB which corresponds to the case where θ is 0° in FIG. 4(b). FIG. 5(b) is the cross-section cut along the line BB which corresponds to the case where θ is 90° in FIG. 4(b).

Figure 6:
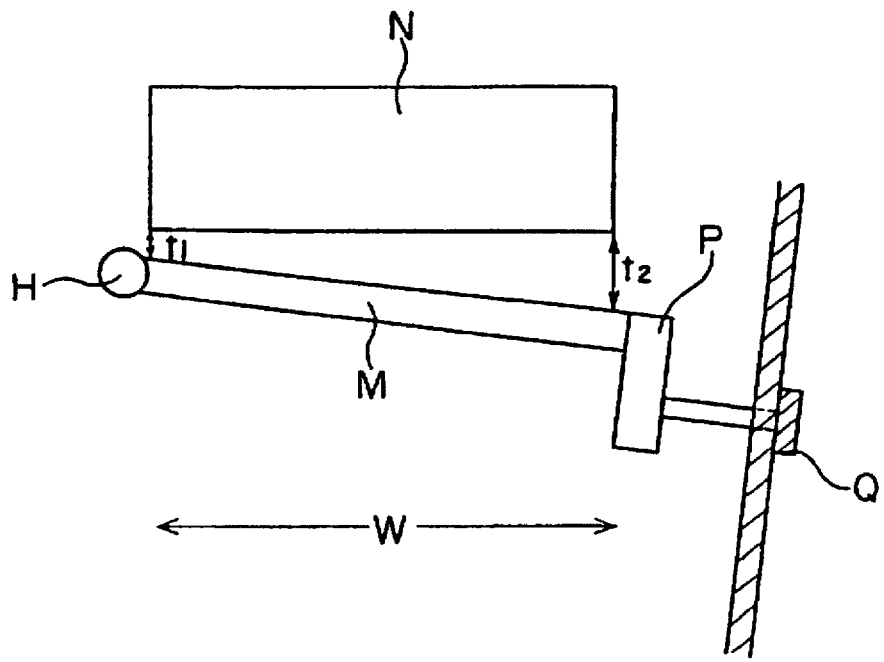

FIG. 6 is a plan view showing an embodiment in which the spacing of a slit is adjusted by a hinge.

Figure 7:
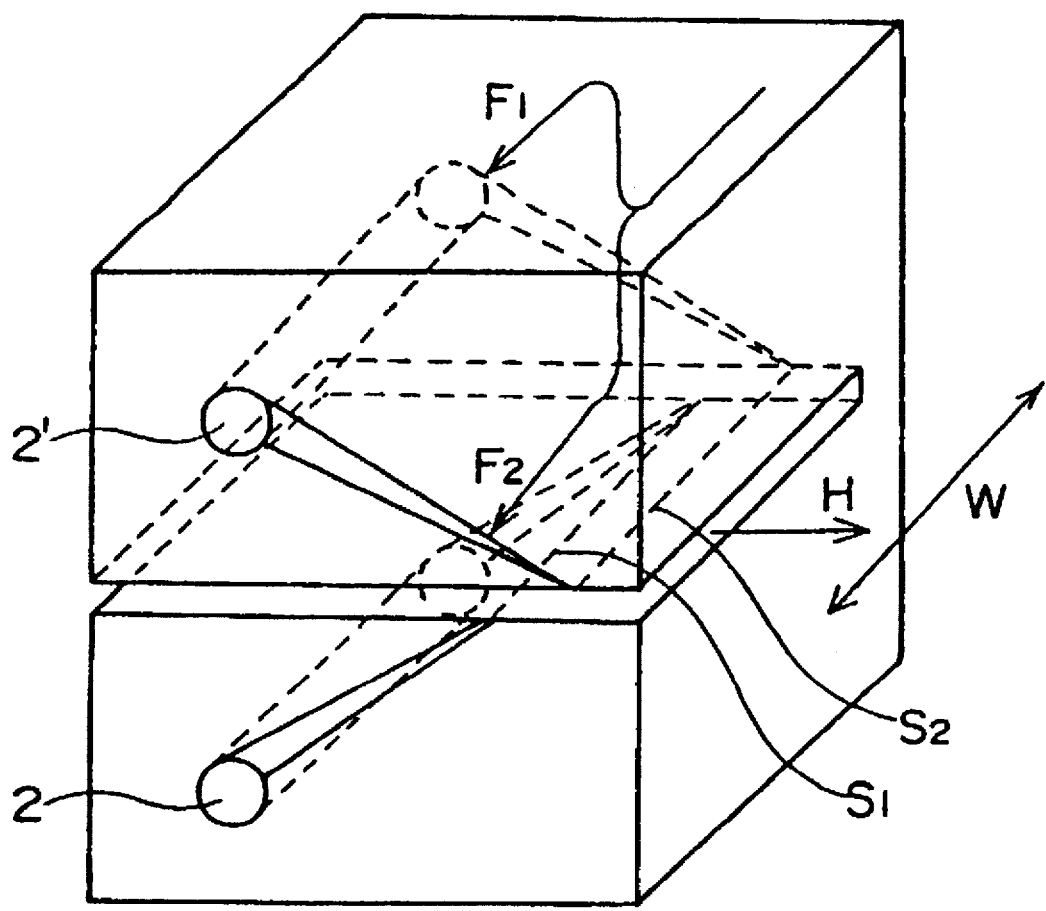

FIG. 7 is a perspective view showing a conventional coating die.

Some of essential reference numerals are listed below.

2, 20: A path for supplying a thermoplastic resin

3: Slit

22: Narrow part of the path for supplying a thermoplastic resin melt

W: Width direction of a web $A_1, A_2, \ldots A_n$: Block pieces $B_1$ through $B_6$: Block pieces $t_1, t_2$: Spacing of a slit H: A hinge Coating dies for producing a long fiber-reinforced thermoplastic resin composition according to the aspects of the present invention will next be described with reference to the drawings.

FIG. 1(a) is a plan view of a slit-like port (a slit) 3 for extruding a thermoplastic resin according to a first embodiment of the invention, as viewed when the die is cut through the interior passage of the die provided for passing a web therethrough in the case where a thermoplastic resin melt for coating a web is supplied from beneath the web. FIG. 1(b) is a cross-section of (a) cut along the line AA. The left hand side of FIG. 1(b) becomes the top of the die. A thermoplastic resin melt is introduced into the die from an extruder 1, passes through a path 2 provided inside the die for supplying a thermoplastic resin melt as shown in FIG. 1(b), and is extruded through slit 3 over the width W of the web. Numeral 4 indicates a rough surface of the die in the subsequent impregnation step. In FIG. 1(a), the spacing of the slit is tapered from the left hand side spacing $t_1$ to the right hand side spacing $t_2$ ($t_2 > t_1$). Since the right hand side (slit spacing: $t_2$) of the die is more remote from the extruder 1 than is the left hand side (slit spacing: $t_1$) and as a result undergoes a smaller resin pressure, the spacing of the slit is increased. With this structure, it is possible to achieve extrusion of a thermoplastic resin with an almost uniform volume in the width direction of the web. Therefore, if the die has a structure in which a thermoplastic resin melt is supplied from the left hand side as shown in FIG. 1, in contrast to the previous situation in which shortage of a resin or insufficient extrusion of a resin occurs at the right hand side of the slit to cause uneven extrusion in the width direction W of the web when the resin is extruded through a slit with a constant spacing, the present embodiment in which the spacing of the slit at its right hand side $t_2$ is made greater than $t_1$ at the left hand side can suppress shortage of a resin at the right hand side, obtaining a uniform amount of extrusion in the width direction of the web. The values $t_1$ and $t_2$ are selected so as to assume a proper ratio in accordance with conditions such as the species of the resin material and the extrusion temperature. Depending on the fluidity behavior of the thermoplastic resin melt, the slit may have a spacing having a certain curved configuration rather than the tapered spacing.

While referring to FIG. 2, an embodiment in which block pieces are used for changing the spacing of a slit in the width direction of a web is described. FIG. 2 is a schematic illustration of a slit. The broken line of the slit 3 shows the case where the spacing of the slit is constant and not changed in the width direction W of a web. In this embodiment of a die, however, block pieces $B_1$ through $B_6$ are retracted or advanced in the direction perpendicular to the direction W and are fixed after their positions are adjusted. In this particular embodiment, the spacing is stepwise varied from $t_1$ to $t_2$ in the width direction W of a web so as to widen the spacing of the slit. In cases where the right hand side of the slit is considerably liable to shortage of a thermoplastic resin melt, or where extrusion volume is significantly insufficient, the amount of extrusion can be made uniform by making the distance $t_2$ greater than $t_1$. If a prolonged portion in the width direction of a web represents a satisfactory extrusion (where occurrence of shortage of a resin is suppressed), the width of a block piece $L_1$ may be made greater than that of another piece, for example greater than $L_2$ as shown in FIG. 2 so as to vary the spacing of the slit in a stepwise manner. Moreover, if necessary, the spacing of the slit may be varied in a curved manner by modifying the shape of the fore end of the block piece.

Figure 3:
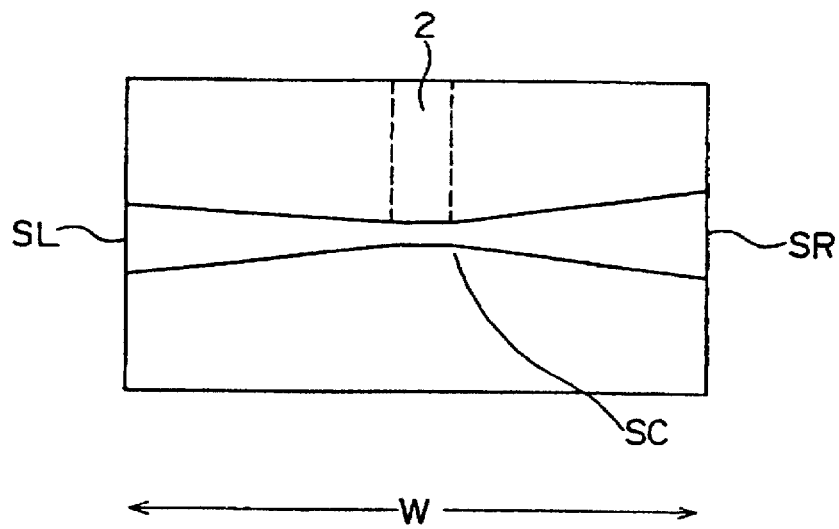

An embodiment in which the spacing of a slit is varied in the width direction W of a web in a more complicated manner is described while referring to FIG. 3. In contrast to cases shown in FIGS. 1 and 2 where the spacing of a slit uniformly increases from the left hand side to the right hand side in the drawings, an embodiment shown in FIG. 3 can achieve the object of the present invention, i.e., make uniform the extrusion volume through a slit if the port 2 for supplying a thermoplastic resin into the die is located at a position which faces the vicinity of the center in the width direction of a web, and the path leading to the slit is branched in the right and left directions. Briefly, at the vicinity of the center of the slit, pressure and temperature of the resin are higher than those at other portions, and accordingly, the fluidity of the resin is high. As this means less risk of occurrence of shortage of resin, the spacing of the slit SC is made relatively small. On the other hand, at the left and right hand sides which are remote from the central supply port, pressure and temperature of the thermoplastic resin melt is reduced so as to decrease the fluidity of the resin melt and to raise the risk of resin shortage, the slit spacings SL and SR are nearly equally increased. With this structure, it is possible to achieve more uniform extrusion in the width direction W of a web relative to the case where a resin is extruded through a slit with a constant spacing.

Another embodiment is described while referring to FIGS. 4(a) and 4(b), in which the supply volume of a thermoplastic resin melt is made variable in the width direction of a web by reducing the spacing of the narrow part of the resin path leading to the slit by the use of retractable block pieces. FIG. 4(a) is a plan view of a slit similar to that shown in FIG. 1. FIG. 4(b) shows the cross-section of FIG. 4(a) cut along the line BB. In FIGS. 4(a) and 4(b), a thermoplastic resin melt is introduced through an extruder 10 into the die, passes through a path 20 provided inside the die, and is distributed over the web in its entirety in the width direction W of the web. The resin thus supplied is extruded through the slit S after passing between a block piece A supported by a bolt 25 and a narrow part of the resin path 22 inside the die body. Each of the block pieces $A_1$ through $A_n$ is provided with a bolt. By adjusting the bolts, the block pieces are each independently retracted or advanced so as to widen or narrow the resin path.

As described above, by controlling the spacing of the narrow part of the resin path leading to the slit portions $L_1$ through $L_n$ corresponding to the block pieces $A_1$ through $A_n$, respectively, it is possible to adjust the extrusion volume so as to make it uniform in the width direction W of a web through the slit having a constant spacing in accordance with the fluidity behavior of the thermoplastic resin to be used.

For example, if the narrow part of the resin path leading to the slit portion $L_1$ is minimized by the use of a block piece $A_1$ and the position of each block piece is adjusted by a bolt so that the spacing of the narrow part gradually increases toward the block piece $A_n$, effects similar to those obtainable from the embodiment shown in FIG. 2 can be obtained.

The angle of inclination θ of the narrow part of the path for supplying a thermoplastic resin melt with respect to the die body, the narrow part being formed between the block A in FIG. 4(b) and the narrow part 22 of the resin path is not particularly limited. The angle may be approximately 60° as shown in FIG. 4(b). Alternatively, it may be 0° as shown in FIG. 5(a), or 90° as shown in FIG. 5(b). In both drawings, only an essential portion of a cross section cut along the line BB in FIG. 4(b) is illustrated.

Another embodiment will next be described while referring to FIG. 6. In this embodiment, a hinge is used to alter the spacing of a slit in the width direction of a web. In FIG. 6, H indicates a hinge, M indicates a movable slit-forming member, P indicates its fore end, and N indicates a stationary slit-forming member. The movable slit-forming member M is moved, about the hinge H, with respect to the stationary slit-forming member N. The movable slit-forming member M is fixed to its counterpart at a proper position using a bolt Q, etc. This makes it possible to vary the spacing of a slit in a tapered manner in the width direction W of a web over one end with a narrow spacing $t_1$ to another end with an expanded spacing $t_2$. In FIG. 6, a slit-end sealing means is not shown which is required by the movable slit-forming member M.

When a continuous fiber bundle in the form of a web is coated with a thermoplastic resin melt, the resin melt may be extruded from above the web or from both the upper and lower side of the web as shown in FIG. 7, rather than being extruded from beneath the web.

Examples of the thermoplastic resin used for applying to a fibrous web for impregnation include polyolefins such as polyethylene and polypropylene; polyesters such as polyethylene terephthalate and polybutylene terephthalate; polyamides such as nylon 6, nylon 66, nylon 11, nylon 12, nylon 610 and nylon 612; polyacetals, polycarbonates, polyurethanes, polyphenylene sulfides, polyphenylene oxides, polysulfones, polyetherketones, polyetheramides, polyetherimides, other thermoplastic resins, and combinations of these. The molecular weight of these resins is not particularly limited so long as they exhibit proper fiber-reinforcing effects when permeated into the fibers.

Various additives may be added to the thermoplastic resins in accordance with the end use of the resin composition and conditions under which the resin composition is used. Such additives include anti-oxidants, antistatics, impregnation accelerators, plasticizers, mold releasing agents, fire retardants, fireproofing aids, crystallizing accelerators, colorants, and fillers.

As described above, if the coating die for producing a long fiber-reinforced thermoplastic resin composition of the present invention is used, irrespective of the position at which a thermoplastic resin melt is introduced into a die or of changes in fluidity behavior of the resin melt, it is possible to control and suppress uneven extrusion in the width direction of a web when a thermoplastic resin melt is extruded through a slit having approximately the same width of a continuous fiber bundle in the form of a web. As a result, the invention provides an effect of suppressing the risk of partial shortages or the like of a resin in the width direction of the web compared to the case where a coating die with a constant spacing is used.

Moreover, if block pieces are used, finer adjustment can be achieved. In addition, even when part of a block piece is accidentally broken for some reason, exchange of that particular piece makes it ready to use the coating die.

We claim:

1. An apparatus for producing a long fiber-reinforced thermoplastic resin composition comprising:
   a fiber loosening device which loosens a moving continuous fiber bundle and thereby form a web-like continuous fiber bundle; and
   a coating die which receives the moving continuous fiber bundle loosened by the fiber loosening device, said coating die including a slit cooperatively connected to an extruder for coating at least one side of the moving web-like continuous fiber bundle with a thermoplastic resin melt which is extruded through the slit by the extruder, the slit having substantially the same width as that of the web-like continuous fiber bundle, for providing even supply of the resin melt in the widthwise direction of the web-like continuous fiber bundle,
   the slit having varying spacing at a point in the widthwise direction of the web-like continuous fiber bundle so as to have an increased spacing as the point is more remote from a feed port and having a constant spacing in a flow direction of the thermoplastic resin melt, and
   the die having an impregnating device for impregnating the web-like continuous fiber bundle with the thermoplastic resin melt in which a path of the impregnated web-like continuous fiber bundle has a rough surface.

2. A method for producing a long fiber-reinforced thermoplastic resin composition, comprising the steps of:
   (a) loosening a continuous fiber bundle by a fiber loosening device so as to form a moving web-like continuous fiber bundle;

(b) coating at least one side of the moving web-like continuous fiber bundle which passes through the die with a thermoplastic resin melt which is extruded through a slit disposed in the die by an extruder, the slit having substantially the same width as that of the web-like continuous fiber bundle, for providing even supply of the resin melt in the width direction of the web-like continuous fiber bundle, the slit having a changing spacing at a point in the width direction of the web-like continuous fiber bundle so as to be increased as the point is more remote from a feed port and having a constant spacing in the flowing direction of the thermoplastic resin melt;

(c) impregnating the web-like continuous fiber bundle with the resin melt through an impregnating step having a path which has a rough surface, and (d) shaping the impregnated web-like continuous fiber bundle to form a final product.

3. A coating die for producing a long fiber-reinforced thermoplastic resin composition in which at least one of the upper and lower sides of a moving web-like continuous fiber bundle which has undergone fiber-loosening by a fiber loosening device and which has passed through the die is coated with a thermoplastic resin melt, said die comprising:

a slit through which the thermoplastic resin melt is extruded by an extruder, the slit having substantially the same width as that of the web-like continuous fiber bundle, and an impregnating device for impregnating the web-like continuous fiber bundle with the thermoplastic resin melt in which a path of the web-like continuous fiber bundle has a rough surface, wherein the slit changes spacing at a point in the widthwise direction of the web-like continuous fiber bundle so as to have an increased spacing as the point is more remote from a feed port and has a constant spacing in a flow direction of the thermoplastic resin melt for providing an even supply of the resin melt in the widthwise direction of the web-like continuous fiber bundle.

4. A coating die as in claim 3, wherein the spacing of the slit is tapered.

5. A coating die as in claim 3, which includes retractable block pieces for changing the spacing of the slit.

6. A coating die for producing a long fiber-reinforced thermoplastic resin composition in which at least one of the upper and lower sides of a moving web-like continuous fiber bundle which has undergone fiber-loosening by a fiber loosening device and which has passed through the die is coated with a thermoplastic resin melt, said die comprising:

a slit having substantially the same width as that of the web-like continuous fiber bundle, and an impregnating device for impregnating the web-like continuous fiber bundle with the thermoplastic resin melt in which a path of the web-like continuous fiber bundle has a rough surface, wherein one of slit-forming members which forms the slit therebetween is stationary and the other slit-forming member is pivotal about a hinge provided at one end thereof about a feed port so as to be increased as a point of the slit becomes more remote from the feed port and to have a constant spacing in a flow direction of the thermoplastic resin melt for providing an even supply of the resin melt in the widthwise direction of the web-like continuous fiber bundle.

7. A coating die as in claim 6, wherein the spacing of the slit is tapered.

8. A coating die for producing a long fiber-reinforced thermoplastic resin composition in which at least one of the upper and lower sides of a moving web-like continuous fiber bundle which has undergone fiber-loosening by a fiber loosening device and which has passed through the die is coated with a thermoplastic resin melt, said die comprising:

a slit having substantially the same width as that of the web-like continuous fiber bundle, and an impregnating device for impregnating the web-like continuous fiber bundle with the thermoplastic resin melt in which a path of the web-like continuous fiber bundle has a rough surface, wherein said die has a resin supply path having a narrow part leading to the slit in the die, the narrow part being towards the slit at the vicinity of the center of the path between a feed port and the slit, said die having retractable block pieces which change the narrow part spacing and reduces the narrow part spacing as a point thereof more remote from a feed port while having a constant spacing in the flow direction of the thermoplastic resin melt for providing an even supply of the resin melt in the widthwise direction of the web-like continuous fiber bundle.

* * * * *